United States Patent Office 3,231,523
Patented Jan. 25, 1966

3,231,523
HALOACETONITRILE REACTION PRODUCTS
AND PREPARATION THEREOF
Robert J. Wineman, Concord, Robert M. Kliss, Marblehead, and Clifford N. Matthews, Winchester, Mass., assignors to Monsanto Research Corporation, St. Louis, Mo., a corporation of Delaware
No Drawing. Filed May 17, 1962, Ser. No. 195,437
14 Claims. (Cl. 260—2)

This invention relates to compounds containing C bonded to N, and more particularly, provides novel methods of converting haloacetonitriles to polymers and to lower molecular weight compounds comprising nitriles, and novel polymeric products prepared thereby.

Treating a haloacetonitrile with a reagent able to remove halogen therefrom has hitherto been employed to produce useful products from haloacetonitriles by reaction with other chemical compounds present in the reaction mixture.

It is an object of this invention to provide a novel method of converting a haloacetonitrile to useful products.

A particular object of this invention is to provide novel methods of obtaining valuable products containing C bonded to N from haloacetonitriles.

Another object is to provide novel products containing C bonded to N.

These and other objects will become evident from a consideration of the following specification and claims.

When a haloacetonitrile is treated with a reagent capable of removing halogen therefrom in the essential absence of other reactive materials, it is found that the reaction product comprises a dark-colored material which can be recovered as a residue on removing distillable components of the reaction mixture.

It has now been found that this residue comprises a valuable polymer, which can be isolated from associated reaction products to provide a new and useful product.

Pyrolysis of polyacrylonitrile is known to produce a black material characterized by infrared absorption corresponding to C bonded to N in a conjugated cyclic structure. These units of this product have been assigned the structure

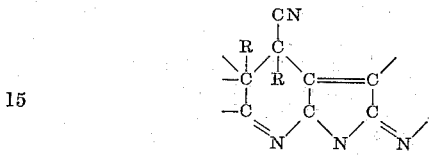

The presence of long chains of conjugated unsaturation has been identified as a characteristic of organic materials with semiconductor properties, and the stated pyrolysis product has been found to have semiconductor properties.

The polymeric product provided by this invention has similar spectral absorption corresponding to C bonded to N in a conjugated cyclic structure. It has the empirical formula [$C_4N_2R_x$] where R is selected from H, halogen and hydrocarbon, and $x$ is an integer of from 0 to 2.

The formulas which can be assigned to the repeating units of the stated formula include

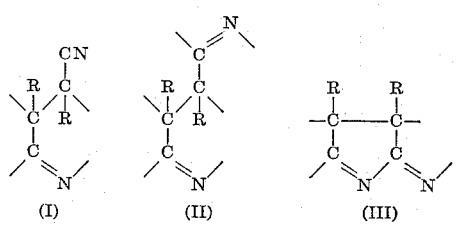
(I)    (II)    (III)

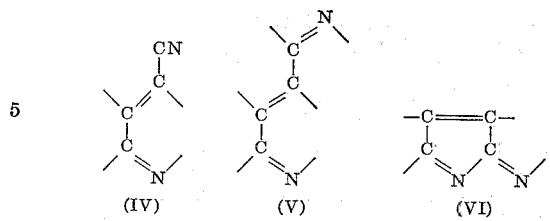
(IV)    (V)    (VI)

and combinations such as

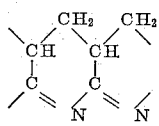

The polymer obtained initially exhibits nitrile absorption. At 250–300° C., it undergoes a thermal change and the nitrile absorption of the product is decreased. This is analogous to the changes undergone by polyacrylonitrile in pyrolysis, and can be understood to represent condensation of residual nitrile as in Formulas I and IV to conjugated structures containing C bonded to N as in structures II and V. Removal of the R groups may occur prior to isolation of the polymer and also during heating.

It will be observed that the pyrolyzed polyacrylonitrile structure can be regarded as a condensed cyano ethylene polymer: the C bonded to N is a substituent on every second carbon atom of the polymer "backbone." The present polymer has twice the ability to form conjugated cyclic structures, having the C bonded to N substituent on each carbon atom in the polymer backbone chain. It may be regarded as a condensed cyano methylene polymer.

When two of the four substituents on a carbon atom are removed, it forms an intermediate which may be termed a methylene diradical or carbene. Thus for example, the intermediate through which the formation of the present polymers proceeds may be a cyano carbene such as fluoro cyano carbene. It is known that if a haloacetate ester is dehydrohalogenated in the presence of an olefin, it forms a halo carbalkoxy carbene, which is trapped by the olefin to form a cyclopropane. When a haloacetonitrile is substituted for this ester, however, if any cyclopropane is formed, it is present in negligible amounts. On the other hand, operating in the absence of another reactive compound in accordance with the present invention does yield products which can be identified as derived from an intermediate which is a 1,1-diradical or carbene. As will be appreciated by those skilled in the art, the formation of the conjugated chains of C bonded to N in the polymer of the invention is probably due to the decay of the carbene to a 1,3-diradical as a further intermediate.

But regardless of the mechanism, the present method provides an advantageous means of producing polymers containing C bonded to N in a conjugated cyclic structure, avoiding the necessity for the high temperatures and accompanying degradation involved in polyacrylonitrile pyrolysis.

In conducting the method of this invention to provide the above-discussed polymeric product, the haloacetonitrile will be contacted with a reagent which removes halogen therefrom by a mechanism removing two substituents from a single carbon atom. As will appear hereinafter, this may comprise dehydrohalogenation with a base, removing H and halogen, or dehalogenation with a metal, removing two halogen atoms. In any case, there will then be isolated from the resulting reaction product a polymeric material characterized by the empirical formula [$C_4N_2R_x$] where R is selected from H, halogen, and hydrocarbon and $x$ is an integer of from 0 to 2, in which the repeating units contain C bonded to N in a conjugated cyclic structure. To provide the present novel polymeric product as herein claimed, adapted for use as a semiconductor, the isolated product will have a chain length sufficiently high to make the polymer light-absorbing and black in color, and be substantially freed of lower molecular weight reaction products.

In the method of the invention comprising dehalogenating a haloacetonitrile with a metal, the polymer is recovered with metal intimately associated therewith, probably by chelation. The novel products provided by this invention include such metal-polymer complexes as well as the polymers themselves, and also the products of heating the polymers to a temperature sufficient to produce decrease of the infrared absorption corresponding to nitrile groups exhibited by said polymers.

These novel polymeric products have many useful properties. They may be used as semiconductors. The polymers have a strong binding power for metals, and may be used as salt sequesterants, to separate metals from solutions. The metal-polymer adducts have high thermal stability and may be employed as metal surface coatings to provide protective, heat-resistant metal surfacing materials. The present polymers may also be hydrolyzed to provide dispersing agents.

In conducting the method of the present invention, it has further been discovered that under certain conditions, removal of halogen from a haloacetonitrile comprises an advantageous method for the preparation of compounds which may be generically described as dimeric nitriles.

Thus, the products of the said method include succinonitriles, which may be regarded as the dimer of the intermediate formed by removing one halogen atom from a haloacetonitrile. For example, the formation of tetrachlorosuccinonitrile from trichloroacetonitrile may be represented by the following equation:

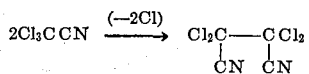

Even more importantly, it is found that the stated dimeric products include unsaturated dinitriles such as dichloromaleonitrile and dichlorofumaronitrile, as represented by the equation:

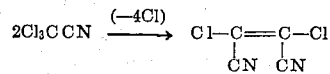

(where the formula given is intended to represent indifferently either or both of the isomers). These olefinic nitriles, particularly the dihalo nitriles, are available otherwise only by difficult and circuitous routes, whereas the present invention provides a direct and inexpensive method for their synthesis.

Furthermore, the products of the stated method have also been found to include novel 3-aza-1,3-pentadienenitriles, such as

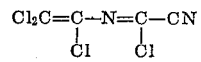

as further set forth in copending application S.N. 195,426, now issued as U.S. Patent 3,095,441, of Robert M. Kliss. It will be observed that this structure contains two CCN groups in series, and thus again may be regarded as a nitrile which is a product of dimerization of an intermediate formed by removal of halogen from a haloacetonitrile, in this case accompanied by rearrangement. The stated products are new compounds.

As mentioned above, it is found that the stated nitrilic dimers are formed from the haloacetonitriles under particular conditions. If the haloacetonitrile is heated with a metal such as copper in an inert hydrocarbon solvent such as benzene, no reaction is observed even on prolonged refluxing. Under the same conditions but using a complexing solvent such as tetrahydrofuran as the reaction medium, the sole product isolated was the above-discussed polymeric product. But refluxing a reaction mixture consisting essentially of haloacetonitrile and the metal, in the absence of solvent, was found to provide the above-stated dimeric nitrile products.

Thus a further embodiment of the present invention, besides the methods including isolation of polymer as hereinabove described, comprises dehalogenating a haloacetonitrile with a metal and isolating from the resulting reaction products a nitrile which is the dimer of an intermediate formed by removal of halogen from said haloacetonitrile.

In conducting the methods of the present invention, the haloacetonitriles used for the starting materials are generally represented by the formula

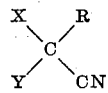

where X is halogen, Y is selected from H and halogen, and R is selected from H, halogen and hydrocarbon. Halogen includes bromine, chlorine, fluorine and iodine. Hydrocarbon includes saturated aliphatic (cyclic, straight and branched chain) and aromatic-aliphatic of up to ten carbon atoms.

At least one of Y and R will be halogen in the embodiment of the invention in which a metal is used to dehalogenate a haloacetonitrile, and at least one of Y and R will be H in the embodiment of the invention comprising the dehydrohalogenation of a haloacetonitrile with a base. Obviously some haloacetonitriles in which the alpha carbon atom substituents consist of two halogen atoms and one hydrogen atom will be useful in practicing either of the stated methods.

Illustrative of the presently useful haloacetonitriles adapted for conversion to useful products by dehalogenation in accordance with this invention are trihaloacetonitriles including for example trichloroacetonitrile, tribromoacetonitrile, dibromoiodoacetonitrile, difluoroiodoacetonitrile, dichlorofluoroacetonitrile, and the like. Dihaloacetonitriles which may be employed in either of the dehalogenation and the dehydrohalogenation methods of the invention include for example dibromoacetonitrile, dichloroacetonitrile, diiodoacetonitrile, bromochloroacetonitrile, bromofluoroacetonitrile, chlorofluoroacetonitrile and the like. Exemplary of the haloacetonitriles which may be employed in the dehydrohalogenation method of the invention are chloroacetonitrile, bromoacetonitrile, fluoroacetonitrile, iodoacetonitrile and the like. While the stated haloacetonitriles are especially preferred, those wherein one of the substituents of the alpha carbon atom is hydrocarbon can also be employed. In this instance, preferably the hydrocarbon group is lower alkyl saturated aliphatic hydrocarbon such as methyl, ethyl, isopropyl, tert-butyl, amyl and hexyl; but other groups such as phenyl and cyclohexyl are also included. Illustrative of the preferred haloacetonitriles in this class are for example, 2,2-dichloropropionitrile, 2,2-dibromopropionitrile, 2,2-dichlorobutyronitrile, 2,2-dichlorovaleronitrile, 2,2-dibromocapronitrile, 2,2-diiodopropionitrile and so forth. The hydrocarbon group may also be cycloaliphatic as illustrated by alpha-dichlorocyclohexaneacetonitrile, or aromatic-aliphatic, as illustrated by 2-chloro-2-phenylacetonitrile, 2,2-dibromo-2-tolylacetonitrile and the like.

In conducting the method of this invention comprising dehydrohalogenating an acetonitrile, the haloacetonitrile will be contacted with a base. Suitable bases include, as a first class, metal alkoxides. These may be alkali metal alkoxides, where the alkoxy radical is saturated lower alkyl, such as potassium t-butoxide, sodium butoxide, sodium methoxide, potassium ethoxide, lithium propoxide, and the like. The alkoxides of other suitable polyvalent metals such as aluminum triisopropoxide, titanium tetrabutoxide and so forth may also be employed if desired.

Another class of presently useful metal compounds acting as bases for the dehydrohalogenation of the haloacetonitriles are metal hydrides such as sodium hydride, lithium hydride, potassium hydride, magnesium hydride and the like.

The useful bases also include organolithium compounds such as butyl lithium, phenyl lithium, ethyl lithium, and so forth, and other alkali metal organometallics such as naphthyl sodium, trityl sodium, benzyl potassium, and the like.

The amount of base to be employed in treating the haloacetonitrile to produce one of the presently provided polymers may vary. In general, at least one mole of base per mole of haloacetonitrile will be employed. The stoichiometric amount of base for complete dehydrogenation of the haloacetonitrile will vary depending on the valence of the metal. This invention contemplates either a deficiency or an excess of base, but in general the base will be present in excess, such as up to 2 moles per mole of the haloacetonitrile and ranging up to about 20 times as much base as haloacetonitrile.

Either the haloacetonitrile may itself act as the reaction medium, or the reaction mixture comprising the haloacetonitrile and base may include extraneous solvents and diluents. Suitable inert solvents and diluents in this connection include for example, hydrocarbons such as benzene or hexane and oxygenated solvents free of active hydrogen such as dioxane, diethyl ether, tetrahydrofuran, diglyme (dimethyl ether of diethylene glycol) and the like. Whether solvents and diluents are desirable depends on the reaction system. With a metal hydride, it has been found that introduction of diluents in addition to the inert suspension medium of the hydride lowers the yield of polymer, but with other bases, use of solvents may be preferred.

The temperatures at which the haloacetonitrile and base are contacted may vary from below room temperature (down to temperatures at which the reaction mixture is barely liquid) up to any temperature below the decomposition temperatures of the reaction mixture components. In some cases the reaction may be exothermic and require cooling and/or diluents to moderate its violence, while other pairs of reactants may not react completely until after refluxing at elevated temperatures. Usually suitable temperatures for carrying out the reaction are the reflux temperatures of the reaction mixtures. Ordinarily atmospheric pressures are suitable, but if desired pressure variation may be utilized to facilitate conducting the reaction, for example by carrying out the reaction at pressures down to say about 50 mm. Hg or up to elevated pressures such as 5000 pounds per square inch (p.s.i.). The time required to accomplish the reaction depends upon functional factors such as the reactivity of the reactants, temperature of reaction and so forth.

On completion of the reaction, the polymeric product is now isolated from lower molecular weight materials associated with it in the reaction mixture. The polymer itself is a solid at room temperature, and indeed remains solid up to elevated temperatures, but in combination with lower molecular weight products of the reaction, it forms black tars. Isolation of the solid, useful product from these tars, to the extent that the polymeric product is insoluble in the solvent employed, can be effected by extraction of lower molecular weight material, leaving the polymer in the residue. Additional polymeric product may sometimes be recovered from the extract, where the solvents used for extraction are strongly polar materials such as acetone and acetonitrile, by distilling off the lower molecular weight materials from the extract. After separation of associated molecular weight products, the polymeric products of this invention are isolated as dark colored products which are solid at room temperature and which are infusible at temperatures up to above 200° C.

The method of the second embodiment of this invention comprises dehalogenating a haloacetonitrile by reaction with a metal. As above noted, this dehalogenation forms olefinic nitriles in addition to polymers, and may be practiced for the recovery of either.

The metals which may be used to dehalogenate the haloacetonitrile and provide reaction mixtures from which polymer, olefinic nitriles, or both may be recovered in accordance with this invention, are metals having from 1 to 2 electrons in the outer orbit and an even number of electrons in the next inner orbit and which are capable of forming stable mono- and divalent halides. The metals of this description forming monovalent halides include sodium, potassium, cesium, rubidium, copper and silver. The metals forming divalent halides which may be used in the present method to form polymer and olefinic nitriles include magnesium, zinc, mercury, cadmium, calcium, strontium, barium, titanium, manganese, iron, cobalt, nickel, lead and rhodium. Particularly useful metals are copper, representing the first stated type and zinc, representing the second. Zinc, when used, is preferably coupled with copper as activator.

It has been mentioned above that succinonitriles may be formed along with olefinic nitriles in practicing the method of this invention; this will be true when the metal employed is a member of the first stated group, forming monovalent halides.

The ratio of metal and haloacetonitrile, for optimum conversion of a haloacetonitrile to products of high molecular weight, will be such as to provide at least 1 gram equivalent of metal per mole of the haloacetonitrile, where 1 gram equivalent is 1 gram atom per mole for a monovalent metal like copper and is ½ gram atom for a divalent metal like zinc. Less metal may be used, down to ½ or ⅓ the equivalent ratio, or excess metal may be employed if desired, in an amount providing, for example, two to three times the equivalent ratio.

Solvent present in the reaction mixture has been found to effect the nature of the reaction products significantly, as discussed above. Where olefinic nitriles such as fumaro- and maleonitriles are a desired product of the reaction, the embodiment of the present invention which will be employed will generally be the treatment of a haloacetonitrile of the presently useful type with a metal in the absence of any other solvent, or a complexing solvent, but contacting the haloacetonitrile with the metal, at temperatures sufficient to produce dehalogenation of the nitrile, for only short reaction times. Where it is desired to produce solely polymer as the product of the reaction, the embodiment of the present invention to be employed will comprise treatment of the haloacetonitrile with the metal in a complexing solvent for prolonged times.

Complexing solvents are solvents with a molecular structure which includes an unshared pair of electrons on one atom, such as an organic nitrogen or oxygen compound. Illustrative useful complexing solvents are, for example, the dimethyl ether of diethylene glycol, dimethylformamide, dimethylsulfoxide, tetrahydrofuran, diethyl ether, dioxane, thiophene, pyridine, triethylamine, and the like.

A wide range of temperatures, from below room temperature up to any temperature which is less than the decomposition temperature of the reaction mixture components, may be employed for conducting the method of the invention. With active metals like copper and zinc and with the presently preferred acetonitriles wherein the alpha carbon substituents are selected solely from hydrogen and halogen, the temperatures employed will generally range from about room temperature (30–35° C.) to above 100° C. In general, variation from atmospheric pressure is unnecessary, but the pressure may if desired be varied from subatmospheric, ranging down to say about 50 mm. Hg, to superatmospheric, up to pressures such as about 5000 p.s.i. Catalysts are unnecessary.

On completion of the reaction, dimeric nitriles, if the reaction is conducted to produce them, will be isolated and recovered by usual means such as distillation, extraction, filtration or the like. The polymeric product formed in the stated method will generally comprise a material having pronounced thermal stability and consisting of the polymer with metal bound to it, presumably by chelation. The metal will be removed from this coordination complex if desired by means known to the art for displacing a metal from a coordination compound or chelating agent such as washing with solutions of ions forming soluble compounds of the metals and displacing the metal with a less tightly coordinated ion.

The invention is illustrated but not limited by the following examples in which all parts are by weight unless otherwise noted.

*Example 1*

This example illustrates the conversion of a haloacetonitrile to olefins and polymer by dehalogenation with a metal.

A mixture of 102 parts (about 0.7 mole) of freshly distilled trichloroacetonitrile and 44 parts of finely divided copper powder (about 0.7 gram-atom) is stirred under nitrogen at reflux temperature (70° C.) for eighteen hours. The resulting brown-black reaction mixture is filtered to separate a black solid. This is extracted with water to remove copper salts, providing a brown-black solid polymer with strong infrared bands at $3.0\mu$, $4.5\mu$ and $6.2\mu$. The $4.5\mu$ band is nitrile group absorption. The $3.0\mu$ and $6.2\mu$ bands are characteristic of products containing cyclic structures including —C=N—C=. The dark color is characteristic of conjugated unsaturation.

Ether washes of the polymer are combined with the filtrate separated from it and the mixture is distilled to separate low molecular weight products. After separation of unreacted trichloroacetonitrile, 11 parts of a yellow liquid are recovered boiling at 82–105° C./26 mm. This yellow liquid is separated by vapor phase chromatography, of which the first melts at 52–55° C. This is dichloromaleonitrile (reported melting point 58–59° C. The infrared spectrum has bands at 4.45 and $4.50\mu$ (nitrile), $6.39\mu$ (carbon-to-carbon unsaturation) and at $9.0$–$13.0\mu$ (chlorine substituted on carbon). The second white solid has a melting point of 56.5–58.0° C. and is identified as dichlorofumaronitrile, reported melting point 56.5–58° C. It also exhibits nitrile and carbon-chlorine absorption in its infrared spectrum. The analyses of these olefinic nitriles correspond satisfactorily to the calculated.

$C_4Cl_2N_2$ requires: C, 32.6%; H, 0%; N, 19%; Cl, 48.3%. Found (first solid): C, 32.8%; H, 0%; N, 16.0%; Cl, 48.2%. Found (second solid): C, 33.2%; H, 0%; N, 15.9%; Cl, 47.8%.

Four parts of a white volatile solid separate out during collection of the yellow liquid mixture comprising the maleo- and fumaronitriles. This material melts at 136–139.5° C. and is identified as tetrachlorosuccinonitrile (reported M.P. 130° C.). The infrared spectrum shows nitrile absorption at $4.45\mu$ and carbon-chlorine absorption at $9.5$–$14\mu$.

$C_4Cl_4N$ requires: C, 22.0%; H, 0%; N, 12.8%; Cl, 65.1%. Found: C, 22.2%; H, 0%; N, 12.8%; Cl, 65.1%.

In addition to the foregoing, the distillation produces 4 parts of a yellow liquid, B. 54° C./4.5 mm., $n_D^{24}$ 1.5946. Elemental analysis gives values corresponding to $C_4Cl_4N_2$. From infrared and ultraviolet spectra, this novel material is identified as 3-azatetrachloropentadienenitrile.

*Example 2*

This example illustrates another run in the absence of solvent.

A mixture of 405 parts (about 0.2 mole) of freshly distilled dibromoacetonitrile and 123 parts (about 0.2 gram-atom) of finely divided copper powder is stirred under nitrogen. There is an exothermic reaction and the pot temperature rises from 28° C. to 50° C., remaining mainly at 50° C. over a 3-hour reaction period. At the end of the 3 hours, the mixture is completely solidified and black in color, while colorless droplets are observed on the cooler walls of the flask.

The solid reaction product is extracted with ether, and about 210 parts of unreacted dibromoacetonitrile are recovered in the extract. The ether extract also includes a white solid which is separated by vapor phase chromatography. Its infrared spectrum indicates that it is an azapentadienenitrile having a structure similar to the azapentadienenitrile product of Example 1. The other constituents of the reaction product are also analogous to those formed by the reaction of the trichloroacetonitrile.

*Example 3*

This example illustrates preparation of fluorinated olefins and polymers.

A mixture of 235 parts of dibromofluoroacetamide, and 213 parts of phosphorus pentoxide is heated on an oil bath under reduced pressure of about 150 mm. Hg to between 160° and 170° C. Dibromofluoroacetonitrile distills off. After redistillation, the product boils at 90–91.5° C., 758 mm. Hg, $n_D^{20}$ 1.4620.

This dibromofluoroacetonitrile is now heated with finely divided copper powder, producing difluoromaleo- and difluorofumaronitrile, a fluorine-substituted azapentadienenitrile and polymer, as described in Example 1.

*Example 4*

This example illustrates the conversion of a haloacetonitrile to polymer by reaction with a zinc-copper couple in solvent.

Addition of 173 parts (0.09 mole) of dibromoacetonitrile and 66 parts (0.1 mole) of a zinc-copper couple (prepared by the method described in J. Org. Chem. 24, (1959) 1825) to anhydrous tetrahydrofuran produces an immediate exotherm. After refluxing for two hours, the solution has become black. Continuous water extraction of the solid reaction products remaining after removal of solvent yields shiny black solids, containing bromine, and free of zinc. The black product is the polymer of the invention, characterized by a conjugated cyclic structure including —C=N—C= linkages.

*Example 5*

The procedure of Example 4 is repeated, but diluting the dibromoacetonitrile with the anhydrous tetrahydrofuran before it is combined with a mixture of 26 grams of zinc dust in 50 ml. of tetrahydrofuran. After refluxing two hours, filtration of the solution separates unreacted zinc from the brown-black filtrate. The filtrate contains dibromoacetonitrile and black solid which after continuous water extraction contains 3.8% bromine. The latter solid is the polymeric product of this invention.

*Example 6*

This example illustrates another reaction of dibromoacetonitrile with zinc-copper couple.

A mixture of anhydrous tetrahydrofuran and 984 parts of zinc-copper couple (about 1.5 gram-atoms) is heated to reflux and then 1030 parts (about 0.5 mole) of dibromoacetonitrile are added slowly to the refluxing mixture. After 20 hours at reflux, the tetrahydrofuran is removed, and the remaining brown-black solid is mixed with dimethylformamide. Excess zinc is removed by centrifuging. Addition of water to the dimethylformamide solution precipitates solid which is extracted continuously with water for 4 days until the washes give no precipitate with silver ion. The extracted material is the polymeric product of the invention, containing zinc associated with it. Its infrared spectrum has bands corresponding to hydrogen bonded to carbon and to nitrile groups, and also broad bands at 3.0μ, and 6.2μ. Its elemental analysis is: C, 35.2%; H, 3.2%; N, 11.4%; Br, 1.5%; ash 37.5%. The greenish-yellow residue left on ignition of a sample analyzes for zinc oxide. When the polymer is heated in an isoteniscope, there is a conversion at 283° C., yielding a shiny black solid which has an infrared spectrum exhibiting greatly reduced nitrile absorption as compared to the polymer before heating.

*Example 7*

This example illustrates conversion of trichloroacetonitrile with zinc-copper couple to polymer.

A mixture of 145 parts (0.1 mole) of trichloroacetonitrile, 132 parts (about 0.2 gram-atom) of zinc-copper couple and anhydrous tetrahydrofuran is refluxed under nitrogen for 24 hours. Water is added to the resulting viscous black solution, and then the tetrahydrofuran is removed on a rotary evaporator. Hydrochloric acid is added to remove any unreacted zinc, and then the solids are collected on a filter. After drying in air, the solid is dissolved in dimethylformamide and precipitated with water, after which it is continuously extracted with water to remove metal and inorganic halogen. The product is chlorinated polymer resembling the brominated polymer prepared as described in the preceding example. It has an infrared spectrum similar to that of the product of the previous example, with bands corresponding to carbon-hydrogen and nitrile groups, together with the broad bands at 3.0μ and 6.2μ indicating carbon-nitrogen conjugated chains. Elemental analysis gives the following results: C, 54.4%; H, 4.6%; Cl, 4.5%; N, 15.9%; ash, 4.1%. The ash produced by ignition is a greenish yellow material like that produced in the above example.

*Example 8*

Anhydrous dimethylformamide is mixed with 132 parts of zinc-copper couple (about 0.2 gram-atom) and 145 parts (0.1 mole) of trichloroacetonitrile is added slowly. An exotherm raising the temperature from room temperature to 80° C. is observed, and the exotherm is modified during the addition by ice bath cooling. The resulting brown-black mixture is stirred at room temperature, additional dimethylformamide is added, and the mixture is centrifuged to separate excess zinc. The resulting brown solution upon treatment with water yields a dark brown solid, separated by centrifuging. After extraction with boiling water, polymer is isolated having an elemental analysis as follows: C, 35.5%; H, 1.8%; Cl, 1.5%; N, 15.3%; ash 26.1%. The ash obtained on ignition is a greenish yellow residue like that obtained in the preceding example and thus probably the system contains zinc.

*Example 9*

This example illustrates conversion of a hydrocarbon-substituted acetonitrile to olefins and polymers.

A mixture of 1240 parts (0.1 mole) of 2,2-dichloropropionitrile and 635 parts (0.1 gram-atom) of copper powder is refluxed (105° C.) under nitrogen for 18 hours. The dark-colored reaction mixture is filtered, the solids separated are washed with ether, and the ether washes are added to the filtrate. The filtrate is distilled; after removal of ether and unreacted dichloropropionitrile, 2,3-dichloro - 2,3 - dimethylsuccinonitrile, dimethylfumaronitrile, dimethylmaleonitrile and an azapentadienenitrile are recovered.

The solids separated from the reaction mixture are extracted with water to remove copper salts, and then the infrared absorption spectrum of the product is examined. It exhibits bands at 3.0 and 6.2μ corresponding to conjugated cyclic structures containing a —C=N—C= chain, as well as nitrile absorption at 4.5μ.

*Example 10*

This example illustrates the method of the invention for forming the presently provided novel polymers and isolation thereof wherein a haloacetonitrile is dehydrohalogenated with a base.

Sodium hydride, as a 50% dispersion in an inert hydrocarbon, is added portionwise to a flask containing 55 parts (0.5 mole) of dichloroacetonitrile, under nitrogen, while the reaction mixture is cooled in an ice bath, preventing the temperature from rising above about 50° C., until 12 parts (0.25 mole) of sodium hydride has been added. The reaction mixture is then stirred and refluxed for several hours, by which time the evolution of gas (hydrogen) has slowed. The reaction mixture is filtered to separate black solids which include sodium hydride. The polymeric product of this invention is isolated from these black solids by washing the solid mass with benzene, methylene dichloride, acetonitrile, and ether, after which the sodium hydride is decomposed with water and the remaining water-insoluble residue, which is a hard black solid, is the polymeric product of this invention. Its analysis is as follows: C, 55.29%; H, 4.01%; N, 26.98%; Cl, 3.30%.

The filtrate is extracted with benzene, leaving a black product also identified as polymer as provided by this invention, but differing from the above described polymeric product in being soluble in acetone and acetonitrile. Its analysis is as follows: C, 37.83%; H, 3.38%; N, 20.61%; Cl, 24.26%.

*Example 11*

This example is another illustration of dehydrohalogenation with a base.

A hexane solution of 10 parts of chloroacetonitrile (0.13 mole) is cooled to between —25° and —40° C. while 0.1 mole of butyllithium is added. A dark resinous precipitate forms during the addition, and butane is evolved. The polymer isolated from the precipitate is similar to those produced in the preceding examples, but is brown in color and is soluble in solvents such as acetone. On heating, it turns black but remains acetone-soluble.

*Example 12*

This example illustrates preparation of the presently provided polymer product with a different base.

A mixture of 55 parts (0.5 mole) of dichloroacetonitrile and pentane is cooled to about 5° C., and then potassium t-butoxide is added gradually until 56.1 parts (0.5 mole) has been introduced. The reaction mixture is maintained at about 5 to 10° C. throughout the addition and a further 3 hours of stirring. A reaction mixture comprises a dark brown solid which is separated by filtration from the brown, pentane-containing filtrate. The 71.5 parts of solid recovered are extracted with ether over a period of 20 days, by which time it has taken on a shiny black appearance. The solid is now further extracted with acetonitrile, and a portion is still further extracted with water. Each of the acetonitrile and the acetonitrile-and-water extracted products, which are both black infusible materials, have an absorption spectra corresponding to those of the polymeric products of the previous examples, with absorption bands at 3–3.4, 4.54, 5.8–6.2μ, and weak bands at 3.38μ (C—H) and beyond 6.2μ. The analytical results on the polymers are respectively as follows. The acetonitrile-extracted polymer: 40.6% C, 1.5% H, 20.9% N, 20.3% Cl, and 13.2% ash. The water-extracted polymer: 47.3% C, 1.6% H, 24.3% N, 15.7% Cl, 0% ash.

*Example 13*

This example illustrates the conversion of dibromoacetonitrile with a base.

A mixture of 50 parts of dibromoacetonitrile (0.25 mole) and redistilled pentane is charged to a flask and maintained under nitrogen at 5 to 10° C. while 28.1 parts (0.25 mole) of potassium t-butoxide is added gradually. After completion of the addition, the mixture is stirred at the same temperature for the same period of time as required by the addition, 3 hours, and then the brown-black solid product is separated by filtration. After a week's extraction with ether, polymeric product similar to that produced in the preceding examples is isolated as a black infusible solid.

While the invention has been illustrated with reference to specific preferred embodiments thereof, it is to be appreciated that modifications and variations can be made without departing from the scope of the invention, which is limited only as described in the appended claims.

What is claimed is:

1. The method which comprises dehalogenating a haloacetonitrile of the formula

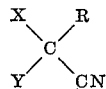

where X is halogen, Y is selected from the class consisting of H and halogen, and R is selected from the class consisting of H, halogen, saturated aliphatic hydrocarbon of up to 10 carbon atoms and aromatic-aliphatic hydrocarbon of up to 10 carbon atoms, and at least one of Y and R is halogen, with a metal having from 1 to 2 electrons in its outer orbit and an even number of electrons in the next inner orbit and which is capable of forming stable mono- and divalent halides, and isolating from the resulting reaction product a polymeric material selected from the class consisting of a polymer in which the repeating units correspond to the empirical formula $(C_4N_2R_x)$ where $x$ is an integer of from 0 to 2 and R is as defined above, said units containing C bonded to N in a conjugated cyclic structure, with a chain length sufficiently high to make the polymer light-absorbing and black in color, substantially free of low molecular weight materials, and insoluble in water and diethyl ether; and polymer as above-defined, associated with said metal.

2. The method which comprises dehalogenating trichloroacetonitrile with copper and isolating from the resulting reaction product a polymeric material selected from the class consisting of a polymer in which the repeating units correspond to the empirical formula $(C_4N_2R_x)$ where R is selected from the class consisting of H and Cl and $x$ is an integer of from 0 to 2, said units containing C bonded to N in a conjugated cyclic structure, with a chain length sufficiently high to make the polymer light-absorbing and black in color, substantially free of low molecular weight materials, and insoluble in water and diethyl ether; and polymer as above-defined, associated with said copper.

3. The method which comprises dehalogenating dibromo acetonitrile with zinc and isolating from the resulting reaction product a polymeric material selected from the class consisting of a polymer in which the repeating units correspond to the empirical formula $(C_4N_2R_x)$ where R is selected from the class consisting of H and Br, and $x$ is an integer of from 0 to 2, said units containing C bonded to N in a conjugated cyclic structure, with a chain length sufficiently high to make the polymer light-absorbing and black in color, substantially free of low molecular weight materials, and insoluble in water and diethyl ether; and polymer as above-defined, associated with said zinc.

4. The method which comprises dehalogenating dibromoacetonitrile with copper and isolating from the resulting reaction product a polymeric material selected from the class consisting of a polymer in which the repeating units correspond to the empirical formula $(C_4N_2R_x)$ where R is selected from the class consisting of H and Br and $x$ is an integer from 0 to 2, said units containing C bonded to N in a conjugated cyclic structure, with a chain length sufficiently high to make the polymer light-absorbing and black in color, substantially free of low molecular weight materials, and insoluble in water and diethyl ether; and polymer as above-defined, associated with said copper.

5. The method which comprises dehalogenating a haloacetonitrile with a metal, in which said haloacetonitrile is of the formula

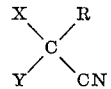

where X is halogen, Y is selected from the class consisting of H and halogen, and R is selected from the class consisting of H, halogen, saturated aliphatic hydrocarbon atoms, and aromatic-aliphatic hydrocarbon of up to 10 carbon atoms, in which at least one of Y and R is halogen, and said metal has from 1 to 2 electrons in its outer orbit and an even number of electrons in its next inner orbit, and a capable of forming stable mono- and divalent halides, and isolating an olefinic nitrile from the resulting reaction product.

6. The method which comprises refluxing a reaction mixture consisting essentially of trichloroacetonitrile and copper and isolating an olefinic nitrile selected from the class consisting of dichloromaleonitrile and dichlorofumaronitrile from the resulting reaction product.

7. The method of providing a polymer in which the repeating units correspond to the empirical formula $(C_4N_2R_x)$ where $x$ is an integer of from 0 to 2 and R is a substituent selected from the class consisting of hydrogen, halogen, saturated aliphatic hydrocarbon of up to 10 carbon atoms and aromatic-aliphatic hydrocarbon of up to 10 carbon atoms, said units containing C bonded to N in a conjugated cyclic structure, with a chain length sufficiently high to make the polymer light-absorbing and black in color, substantially free of low molecular weight materials, and insoluble in water and diethyl ether, which comprises dehalogenating a haloacetonitrile of the formula

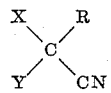

where X is halogen, Y is selected from the class consisting of H and halogen, R is as defined above and at least one of Y and R is halogen, with a metal having from 1 to 2 electrons in its outer orbit and an even number of electrons in the next inner orbit and which is capable of forming stable mono- and divalent halides, in a complexing solvent.

8. The method of providing a polymer in which the repeating units correspond to the empirical formula $(C_4N_2R_x)$ where R is selected from the class consisting of H and Cl and $x$ is an integer of from 0 to 2, said units containing C bonded to N in a conjugated cyclic structure, with a chain length sufficiently high to make the polymer light-absorbing and black in color, substantially free of low molecular materials and insoluble in water and diethyl ether, which comprises refluxing dichloroacetonitrile with the zinc-copper couple in anhydrous tetrahydrofuran.

9. The method which comprises dehydrohalogenating dichloroacetonitrile with sodium hydride and isolating from the resulting reaction product a polymeric material in which the repeating units correspond to the empirical formula $(C_4N_2R_x)$ where R is selected from the class consisting of H and Cl and $x$ is an integer of from 0 to 2, said units containing C bonded to N in a conjugated cyclic structure, with a chain length sufficiently high to make the polymer light-absorbing and black in color, substantially free of low molecular weight materials, and insoluble in water and diethyl ether.

10. As a new compound, a polymer in which the repeating units correspond to the empirical formula $(C_4N_2R_x)$ where $x$ is an integer of from 0 to 2 and R is a substituent selected from the class consisting of hydrogen, halogen and hydrocarbon, said units containing C bonded to N in a conjugated cyclic structure, with a chain length sufficiently high to make the polymer light-absorbing and black in color, substantially free of low molecular weight materials, insoluble in water and in diethyl ether, said polymer being the reaction product of a haloacetonitrile of the formula

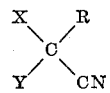

where X is halogen, Y is selected from the class consisting of H and halogen, R is selected from the class consisting of H, halogen, saturated aliphatic hydrocarbon of up to 10 carbon atoms and aromatic-aliphatic hydrocarbon of up to 10 carbon atoms, and at least one of Y and R is halogen, with a metal having from 1 to 2 electrons in its outer orbit and an even number of electrons in the next inner orbit, and capable of forming stable mono- and divalent halides, in the essential absence of other reactive materials, said polymer having said metal bonded thereto.

11. The product of the process of claim 2, associated with said copper.

12. The product of the process of claim 3, associated with said zinc.

13. The product of the process of claim 4, associated with said copper.

14. The product of the process of claim 8, associated with said zinc and copper.

References Cited by the Examiner

UNITED STATES PATENTS 3,056,751   10/1962   Fierce et al. _____ 260—2

OTHER REFERENCES

Grundmann et al.: Justus Liebig's Annalen der Chemie, vol. 577 (1952), pp. 77–95.

Bauer: "Annalen der chemie," vol. 229 (1885), pp. 168–174.

Schaefer et al.: "Jour. American Chem. Soc.," vol. 81, March 1959, pp. 1466–70.

Ruske et al.: "Z. Chem.," vol. 1, 1961, pp. 271–4 (56 Chem. Abstracts 7492 (1962)).

Reynolds et al.: "Jour. of Organic Chemistry," vol. 16, 1951, pp. 165–172.

Diechert et al.: "Jour. of Polymer Science," vol. 54, 1961, pp. S39–40.

MURRAY TILLMAN, *Primary Examiner.*

JOSEPH L. SCHOFER, *Examiner.*